May 27, 1924.
E. I WILTROUT
BEATER OR MIXER
Filed Sept. 2, 1921
1,495,367
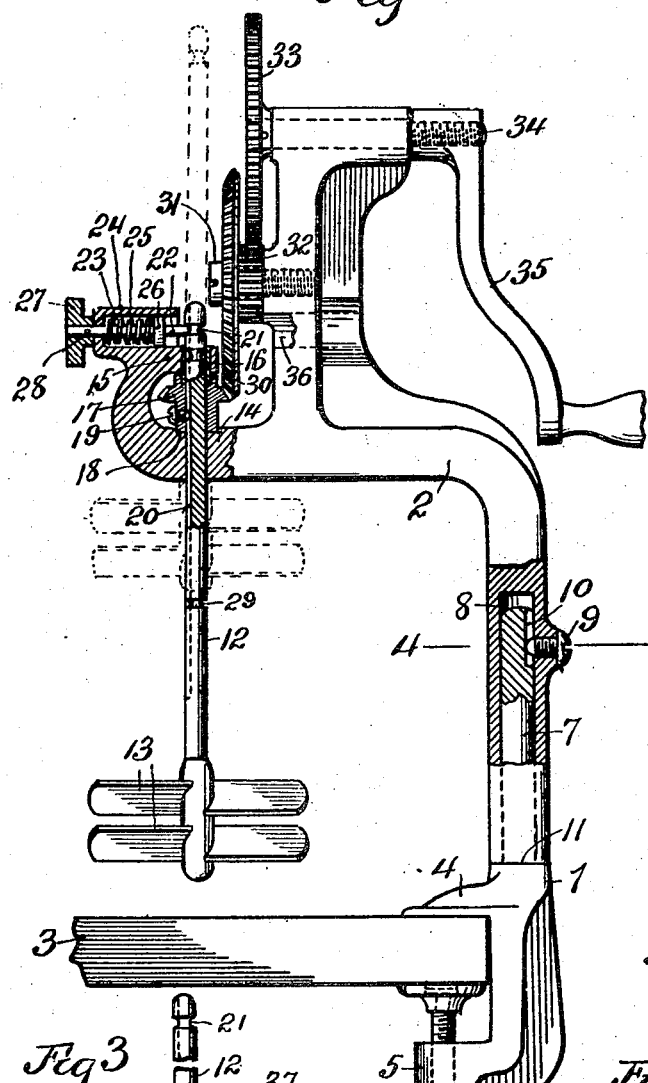
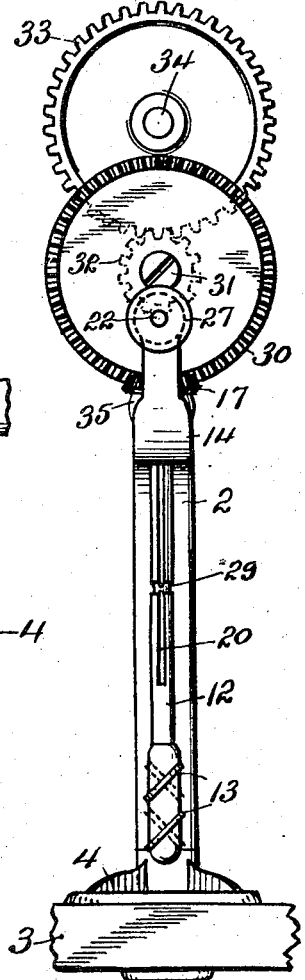
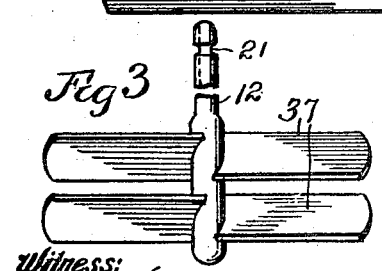
Witness:
R. E. Hamilton
Inventor
Edgar I. Wiltrout
By Warren D. House,
His Attorney Patented May 27, 1924.

1,495,367

UNITED STATES PATENT OFFICE.

EDGAR I. WILTROUT, OF LOGAN, KANSAS.

BEATER OR MIXER.

Application filed September 2, 1921. Serial No. 497,893.

*To all whom it may concern:*

Be it known that I, EDGAR I. WILTROUT, a citizen of the United States, residing at Logan, in the county of Phillips and State of Kansas, have invented a certain new and useful Improvement in Beaters or Mixers, of which the following is a specification.

My invention relates to improvements in beaters or mixers, adapted for beating eggs or batter and, for mixing food ingredients.

One of the objects of my invention is to provide a hand operated beater or mixer, which is simple, cheap to make, durable, not liable to get out of order and which is very efficient in operation.

A further object of my invention is to provide novel means for supporting and rotating the beater shaft and which permits of the ready removal of the beater shaft without detaching the support of the shaft from a table top to which the support is adapted to be firmly attached.

A further object of my invention is the provision of novel means for releasably supporting the beater shaft at different heights.

The novel features of my invention are hereinafter fully described and claimed.

In the accompanying drawing, which illustrates the preferred embodiment of my invention, Fig. 1 is side view partly in vertical section and partly in elevation of my improved beater or mixer shown mounted on a table top.

Fig. 2 is another elevation of the same, partly broken away.

Fig. 3 is a side elevation, partly broken away, of one of the beaters.

Fig. 4 is a cross section on the line 4—4 of Fig. 1.

Similar reference characters designate similar parts in the different views.

The beater is provided with a standard comprising a lower member 1 and an upper member 2.

The member 1 is provided with means for being attached to a table top 3, consisting of an upper jaw 4 which is adapted to rest upon the top of the table, and a lower jaw 5 having fitted in it a vertical thumb screw 6, which is adapted to bear against the under side of the table top 3.

The member 1 is provided with a vertical upwardly extending cylindrical shank 7 on which is vertically slidably fitted the lower tubular portion 8 of the upper member 2.

To hold the member 2 from turning on the shank 7, the tubular portion 8 has fitted in it a horizontal screw 9, the inner end of which extends into a vertical groove 10 provided in the periphery and upper portion of the shank 7. The lower end of the tubular portion 8 is adapted to rest upon a shoulder 11 on the member 1. The member 2 is adapted to be slid upwardly off from the shank 7 or to be lifted thereon to any desired position.

12 designates a vertical beater shaft provided adjacent to its lower end with a plurality of radial blades 13, which may be obliquely disposed as shown.

The member 2 is provided with a U-shaped portion having two arms 14 and 15, the arm 15 being disposed above the arm 14.

A vertical hole extends through the two arms 14 and 15 and in the hole in the upper arm is fitted a sleeve 16, which extends below the lower side of the arm 15 and into a recess provided in the upper end of a bevel gear wheel 17, the lower end of which is mounted in an annular recess or seat 18, which is concentric with the hole in the arm 14.

The beater shaft 12 extends through and is rotatable in the hole in the arm 14 and the sleeve 16. The shaft 12 also extends through the gear wheel 17 and is splined thereto by means of a screw 19, mounted in the hub of the gear wheel and slidably fitted in a longitudinal peripheral groove 20 which extends downwardly in the shaft 12, from the upper end thereof.

For supporting the beater shaft 12 in the lower operative position shown in solid lines in Fig. 1, said shaft is provided near its upper end, with one or more annular grooves 21, in which is adapted to be seated the inner end of a horizontal bolt 22, which is longitudinally slidable in a horizontal hole 23, provided in a boss 24 on the upper side of the arm 15.

Encircling the bolt 22 is a coil spring 25, the inner end of which bears against a collar 26 secured on the bolt 22 in the hole 23, the outer end of the spring bearing against the outer closed end of the boss 24, which closed end is provided with a horizontal hole through which the bolt 22 extends and in which the bolt is slidable. The outer end of the bolt 22 has secured to it by a transverse pin 28 a thumb button 27, by which the bolt may be withdrawn from the groove 21, when it is desired to remove the beater shaft 12 by sliding it downwardly out of the member 2. The thumb button 27, by striking the boss 24, limits the inward movement of the bolt 22.

For supporting the beater shaft 12 in an elevated position, shown in dotted lines in Fig. 1, said shaft is provided with an annular peripheral groove 29, which is adapted to receive the supporting bolt 22.

For rotating the beater shaft 12 through the intermediacy of the bevel gear wheel 17, the latter meshes with a larger bevel gear wheel 30, which is rotatably mounted on a horizontal stub 31, which is mounted in the member 2.

Rotatable on the stub 31 and secured to the gear wheel 30, is a spur gear wheel 32 which meshes with a larger spur gear wheel 33, which is rigidly secured to one end of a horizontal shaft 34, which is rotatably mounted in a hole provided in the member 2 and the other end of which is screw threaded and has fitted to it a crank handle 35.

The member 2 is provided with a horizontal hole 36 through which may be extended a boring instrument for making the hole 23 in the boss 24.

In operating the invention, the thumb button 27 may be pulled outwardly to withdraw the bolt 22 from the groove 21, upon which the beater shaft 12 may be lifted to the position shown in dotted lines in Fig. 1, after which upon releasing the thumb button 27, the spring 25 will force the bolt 22 into the groove 29, thus supporting the beater shaft in the elevated inoperative position. The vessel, not shown, containing the eggs, batter, cream or other material, to be beaten or mixed is placed upon the table top 3 under the beater shaft, after which the bolt 22 is withdrawn from the groove 29 and the shaft 12 is lowered until the groove 21 is in position to receive the bolt 22. The spring 25 will force the bolt into the groove 21. By then turning the crank 35, the beater shaft 12 will be rapidly rotated through the intermediacy of the gear wheels 17, 30, 32 and 33, and shaft 34.

After the beating or mixing operation, the member 2 may be lifted off from the shank 7, after which the beater shaft 12 may be withdrawn from the member 2 by releasing the bolt 22 and pulling the shaft out of the sleeve 16, gear wheel 17 and arm 14. The removed parts may be readily cleansed, after which the beater shaft may be reinserted in the member 2 and the latter may then again be slipped into operative position on the shank 7.

The sleeve 16 and seat 18 retain the gear wheel 17, in operative position, when the beater shaft has been removed, so that the latter may be readily reinserted through the gear wheel 17 and the gear wheel is not liable to be displaced when not engaged with the beater shaft.

By having one or more grooves 21 in the shaft 12, the latter may be adjusted to suit vessels of different thicknesses.

By having the member 2 removably fitted on the shank 7, it is unnecessary to unclamp the member 1 from the table top in order to detach the beater shaft. But, if preferred, the member 1 may be detached from the table and the beater shaft then slid downwardly out of engagement with the standard 2 and gear 17. As the upper end of the beater shaft, when disengaged from the bolt 27, is normally slidable out of the standard 2, and gear 17, the beater shaft may be demounted without disassembling any of the other parts or altering the normal operative condition of the beater shaft.

In Fig. 3, is shown a beater shaft similar to the one above described, but which is provided with wider and longer blades 37. For beating or mixing larger batches, it may be desirable to use the beater shaft having the larger blades, in which case the beater shaft 12 having the smaller blades is removed in the manner already described and the shaft having the larger blades is substituted therefor.

If it is desired to rotate the member 2 on the shank 7 to bring the member 2 into a position in which the beater shaft may be removed without detaching the member 2 from the shank 7, the screw 9 may be turned so as to be withdrawn from the groove 10, after which the member 2 may be revolved to a position diametrically opposite to that shown in Fig. 1, after which the beater shaft may be readily detached.

I do not limit my invention to the structure shown and described, as many modifications, within the scope of the appended claims may be made without departing from the spirit of my invention.

What I claim is.

1. In a beater of the kind described, a standard having a U-shaped portion, the arms of which are disposed one above the other, the arms having a vertical hole extending therethrough, one of the arms having on its upper side an annular seat concentric with said hole, a sleeve fitted in said hole in the other arm and having its lower end projecting, a vertical beater shaft rotatable in said hole and in said sleeve and slidable endwise therefrom, a gear wheel splined on said shaft between said arms and mounted at one end in said seat, said sleeve extending into the other end of said gear wheel, a second gear wheel meshing with the first named gear wheel and rotatable on said standard, means for rotating the second named gear wheel, and releasable means for supporting the beater shaft in the operative position in said hole, substantially as set forth.

2. In a beater of the kind described, a standard having means for attachment to a table top, a vertical beater shaft rotatable in the standard and slidably removable therefrom and having an annular peripheral groove, a bolt movable on said standard into and out of said groove for supporting the beater shaft, means for automatically forcing the bolt into said groove, and releasable means on said standard for engaging and rotating said shaft, substantially as set forth.

3. In a beater of the kind described, a standard having means for attachment to a table top, a vertical beater shaft rotatable in the standard and slidably removable therefrom and having an annular peripheral groove, a bolt movable on said standard into and out of said groove for supporting the shaft, a spring for normally forcing the bolt into said groove and means on said standard for releasably engaging and rotating said shaft, substantially as set forth.

4. In a beater of the kind described, a standard having means for attachment to a table top, a vertical beater shaft rotatable in the standard and slidably removable therefrom and having two annular peripheral grooves, a bolt movable on said standard and adapted to enter either of said grooves for supporting said shaft in two positions, a spring for normally forcing the bolt to the supporting position, and means on said standard for releasably engaging and rotating said shaft, substantially as set forth.

5. In a beater of the kind described, a standard having means for attachment to a table top and provided with a U-shaped portion the arms of which are disposed one above the other and a vertical hole through said arms, the lower arm on its upper side having a seat concentric with said hole, a sleeve fitted in the hole in the upper arm and projecting below the lower side thereof, a gear wheel rotatably mounted in said seat and having in its upper end a recess into which said sleeve extends, a vertical shaft rotatable in said hole and in said sleeve and vertically slidable therein and extending through and splined to said gear wheel and having two peripheral grooves, a spring actuated bolt movable on one of said arms to and from a position in which it is adapted to enter either of said grooves for supporting said shaft in two positions one above the other, a second gear wheel meshing with the first named gear wheel and rotatable on said standard, and means for rotating said second named gear wheel, substantially as set forth.

In testimony whereof I have signed my name to this specification.

EDGAR I. WILTROUT.